(No Model.)
A. HOAK.
FOUNTAIN.
No. 267,689. Patented Nov. 21, 1882.
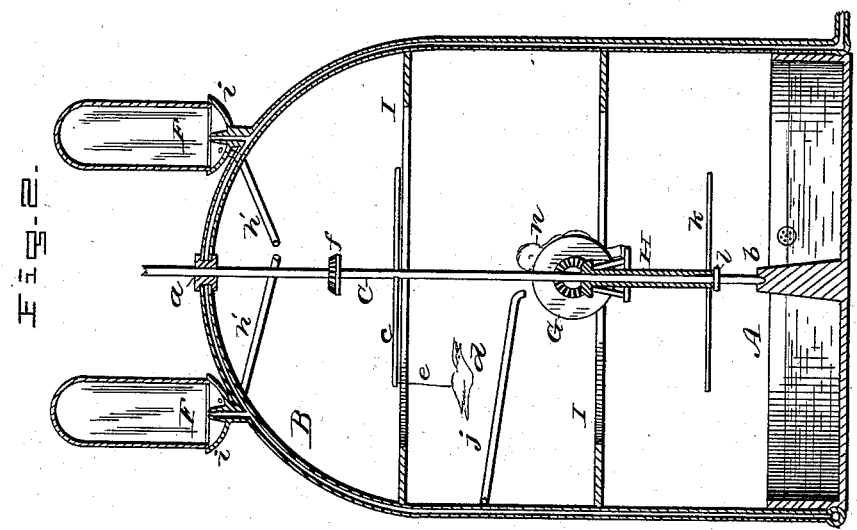
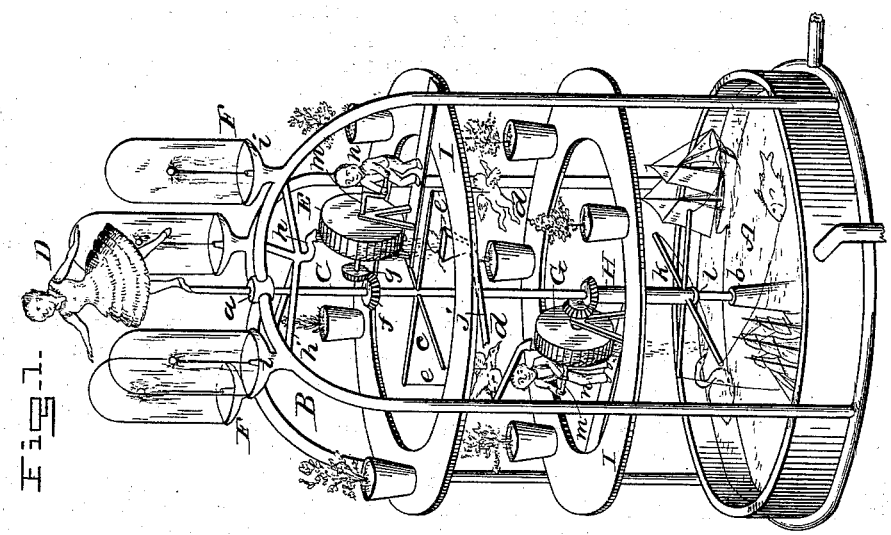
WITNESSES:
Jas. F. DuHamel.
Walter S. Dodge.
INVENTOR:
Amos Hoak,
by Dodge & Son,
Attys.

UNITED STATES PATENT OFFICE.

AMOS HOAK, OF HANNIBAL, MISSOURI.

FOUNTAIN.

SPECIFICATION forming part of Letters Patent No. 267,689, dated November 21, 1882.

Application filed August 22, 1882. (No model.)

*To all whom it may concern:*

Be it known that I, AMOS HOAK, of Hannibal, in the county of Marion and State of Missouri, have invented certain Improvements in Fountains, of which the following is a specification.

My invention relates to fountains; and it consists in a novel construction and combination of parts, hereinafter explained, whereby the waste water of the fountain is caused to impart motion to a central vertical shaft and through said shaft to figures and automata of any desired character.

The principal feature of the invention consists in constructing an arched frame or tripod to support the central vertical shaft, conducting the supply-water through the frame, and delivering the waste water upon a wheel or wheels connected by gearing or belts with said central shaft; but it also consists in other features and details of construction, presently explained.

In the accompanying drawings, Figure 1 represents a perspective view of my fountain, and Fig. 2 a sectional view of the same.

A represents a basin, which constitutes the base of the fountain, and B an arched frame, formed preferably of tubing or water-pipe. In the drawings this frame is shown as consisting of four uprights, meeting at the top in a common center, at which point a perforated block or tubular bearing, $a$, is provided to receive the upper end of a vertical shaft, C, the lower end of which is stepped in a block, $b$, at the bottom of the basin A, as shown. The shaft is thus free to rotate, but is retained at all times in a vertical position. It is carried above the frame B and surmounted by a figure, D, of any suitable character, and is provided with radial arms $c$, from which are suspended figures $d$ of birds or other objects, by fine and practically invisible cords, threads, or wires $e$. The shaft also carries a bevel-pinion, $f$, which meshes with a similar pinion, $g$, on the shaft of a miniature water-wheel, E, which is driven by the waste water escaping from jets F at the top of the frame B, and conducted to the wheel by a pipe or flume, $h$, connecting by branches $h'$ with a cup or basin, $i$, beneath each of said jets, or with a basin common to all of them. The water escaping from pipe $h$ onto the wheel causes it to rotate, and, through the pinions $f$ $g$, imparts motion to shaft C, causing it to revolve and carry around the arms $c$ and the figures suspended therefrom, giving the appearance of birds flying, or other pleasing representations. From the wheel E the water is or may be conducted by a pipe, $j$, to a second wheel, G, and caused to rotate a tubular shaft, H, provided with arms $k$, and encircling the shaft C, and supported by a collar, $l$, thereon, the hollow shaft and its arms being caused to travel in the reverse direction to shaft C.

Figures of ships, fish, and sea-monsters, or other objects may be suspended from the arms $k$ or placed in the water of basin A, and drawn about therein by cords or wires connected with said arms.

I prefer also to provide the shafts of the water-wheels E and G each with a crank, $m$, and to connect with said crank a jointed figure of a man or animal, as indicated at $n$, to produce the appearance of the wheels being actuated thereby.

I prefer also to provide shelves I at suitable intervals to receive flower-pots or other articles and to brace and stiffen the frame B.

The jets F may be of any common or desired form, though I prefer the jet and ball, with a glass globe to protect the jet against wind and to retain and return the ball to the jet.

It is obvious that the details may be varied indefinitely—that is to say, the design of the frame and basin, the character of the jets, and the nature of the figures may be modified as desired or as fancy may suggest.

One or more water-wheels may be employed, as preferred.

The fountain is designed to be a portable structure, to be set upon a lawn or used indoors, in which latter case hose-connections will be made for furnishing the water-supply and carrying off the waste water. The pipes of frame A connect with a common supply-pipe.

I am aware that various automata have been operated by the water of fountains, but, as I believe, by the supply-water instead of the waste, thereby lessening the available force of the water.

Having thus described my invention, what I claim is—

1. In a fountain, the combination of an arched frame containing a water passage or channel and a vertical shaft supported in and by said frame, substantially as and for the purpose set forth.

2. In combination with an arched or outside fountain-frame containing a water channel or passage, a shaft mounted in and supported by said frame, and a water-wheel geared with said shaft, and arranged, substantially as shown and described, to be driven by the waste water of the fountain.

3. The combination of basin A, frame B, having water channel or passage, shaft C, and water-wheel E, arranged, substantially as shown, to receive the waste water which ascends through the frame.

4. The herein-described fountain, consisting of basin A, tubular frame B, shaft C, water-wheel E, geared to the shaft, substantially as shown and described, and waste-pipe $h$, arranged to deliver the waste water upon wheel G.

5. In combination with the frame B, shaft C, and wheel E, tubular shaft H and wheel G, said wheels being geared respectively to shafts C H, substantially as and for the purpose set forth.

6. The herein-described fountain-frame, consisting of tubes or pipes meeting in a common center at the top and communicating with a common supply-pipe below, substantially as shown and described.

7. The herein-described fountain, consisting of basin A, frame B, having jets F at its top, shaft C, water-wheel E, geared to said shaft, arms $c$, projecting from said shaft, and figures $d$, carried by the arms, as shown.

8. In combination with frame B, constructed substantially as shown and described, shelves I, connecting the legs or uprights of the frame, as and for the purpose explained.

9. In combination with frame B, shaft C, and water-wheel geared with said shaft, figure $n$, driven by a crank on the water-wheel shaft, as shown.

AMOS HOAK.

Witnesses:
GEO. H. CARTER,
JNO. I. CARTER.